US009030112B2

(12) United States Patent
Sun et al.

(10) Patent No.: US 9,030,112 B2
(45) Date of Patent: May 12, 2015

(54) ILLUMINATION SYSTEM, AND DRIVING DEVICE AND SIGNAL TRANSMITTER DEVICE THEREOF

(75) Inventors: Tai-Ping Sun, Jhongli (TW); Chia-Hung Wang, Taichung (TW); Jia-Yu Chen, Taichung (TW)

(73) Assignee: National Chi Nan University, Nantou (TW)

( * ) Notice: Subject to any disclaimer, the term of this patent is extended or adjusted under 35 U.S.C. 154(b) by 397 days.

(21) Appl. No.: 13/541,926

(22) Filed: Jul. 5, 2012

(65) Prior Publication Data

US 2013/0088164 A1 Apr. 11, 2013

(30) Foreign Application Priority Data

Oct. 6, 2011 (TW) ............................ 100136350 A

(51) Int. Cl.
*H05B 37/02* (2006.01)
*H05B 37/03* (2006.01)
*H04L 29/00* (2006.01)
*H05B 33/08* (2006.01)

(52) U.S. Cl.
CPC ............ *H05B 33/086* (2013.01); *H05B 37/029* (2013.01)

(58) Field of Classification Search
None
See application file for complete search history.

(56) References Cited

U.S. PATENT DOCUMENTS 6,166,496 A * 12/2000 Lys et al. ...................... 315/316

OTHER PUBLICATIONS

Taiwan Patent and Trademark Office, Office Action, Translation, and Cited References along with the English Translations of their Abstracts for TW100136350 (Cited References TW580847, TW200952324, and TW201002156), Feb. 7, 2014.

* cited by examiner

*Primary Examiner* — Douglas W Owens
*Assistant Examiner* — Dedei K Hammond
(74) *Attorney, Agent, or Firm* — LeClairRyan

(57) ABSTRACT

An illumination system includes: a signal receiver device configured to, in response to a coupling signal, generate a receiver-side signal frame including a control code portion based on control information of the coupling signal; a code extracting unit operable to extract the control code portion from the receiver-side signal frame; and a current providing unit operable to provide a driving current through a light emitting component according to the control code portion extracted from the code extracting unit. The driving current has a magnitude dependent on the extracted control code portion.

10 Claims, 8 Drawing Sheets

ILLUMINATION SYSTEM, AND DRIVING DEVICE AND SIGNAL TRANSMITTER DEVICE THEREOF

CROSS-REFERENCE TO RELATED APPLICATION

This application claims priority of Taiwanese Application No. 100136350, filed on Oct. 6, 2011.

BACKGROUND OF THE INVENTION

1. Field of the Invention

The present invention relates to an illumination system, more particularly to an illumination system, and a driving device and a signal transmitter device thereof.

2. Description of the Related Art

A light-emitting diode (LED) based illumination system may be configured for remote control by users. In an exemplary configuration, the illumination system is connected electrically to a transmitter device via an electrical connection for receiving a control signal therefrom, and is configured to turn on when the control signal is in a first state, and to turn off when the control signal is in a second state. In particular, the control signal is modulated onto a carrier signal at the transmitter device, and is demodulated from the carrier signal at the illumination system.

However, such a control method for LED-based illumination systems may not be able to satisfy certain applications, e.g., stages, and commercial product display.

SUMMARY OF THE INVENTION

Therefore, an object of the present invention is to provide an illumination system capable of alleviating the aforesaid drawbacks of the prior art.

Accordingly, an illumination system of the present invention includes:

- a light emitting component;
- a signal receiver device configured to, in response to a coupling signal that includes control information corresponding to the light emitting component, generate a receiver-side signal frame based on the control information of the coupling signal, the receiver-side signal frame including a control code portion corresponding to the light emitting component; and
- a driving device including
  - a code extracting unit connected electrically to the signal receiver device for receiving the receiver-side signal frame from the signal receiver device, and operable to extract the control code portion from the receiver-side signal frame received by the code extracting unit, and
  - a current providing unit connected electrically to the code extracting unit for receiving the control code portion from the code extracting unit, and connected electrically to the light emitting component for providing a driving current through the light emitting component according to the control code portion received by the current providing unit, the driving current having a magnitude dependent on the control code portion received by the current providing unit.

Another object of the present invention is to provide a driving device for a light emitting component.

Accordingly, a driving device of the present invention is adapted to receive a receiver-side signal frame and is adapted to be connected electrically to a light emitting component for driving the light emitting component according to the receiver-side signal frame. The receiver-side signal frame includes a control code portion corresponding to the light emitting component. The driving device includes:

- a code extracting unit adapted to receive the receiver-side signal frame, and operable to extract the control code portion from the receiver-side signal frame received by the code extracting unit; and
- a current providing unit connected electrically to the code extracting unit for receiving the control code portion from the code extracting unit, and adapted to be connected electrically to the light emitting component for providing a driving current through the light emitting component according to the control code portion received by the current providing unit, the driving current having a magnitude dependent on the control code portion received by the current providing unit.

Yet another object of the present invention is to provide a signal transmitter device for controlling operation of a light emitting component.

Accordingly, a signal transmitter device of the present invention includes:

- a signal modulator unit including
  - an oscillator circuit operable to generate an oscillation signal,
  - an encoder circuit adapted to receive a control signal, and operable to generate a transmitter-side signal frame according to the control signal received by the encoder circuit, the transmitter-side signal frame having a control code portion corresponding to a light emitting component, and
  - a modulator circuit connected electrically to the oscillator circuit and the encoder circuit for receiving the oscillation signal and the transmitter-side signal frame therefrom, and operable to modulate the transmitter-side signal frame onto the oscillation signal so as to generate a modulated signal;
- a signal amplification unit connected electrically to the modulator circuit for receiving the modulated signal from the modulator circuit, and operable to perform signal amplification upon the modulated signal received by the signal amplification unit so as to generate an amplified modulated signal; and
- a signal coupling unit connected electrically to the signal amplification unit for receiving the amplified modulated signal from the signal amplification unit, and operable to generate a coupling signal for transmission according to the amplified modulated signal received by the signal coupling unit, the coupling signal including control information that corresponds to the control code portion of the transmitter-side signal frame and that is for controlling operation of the light emitting component.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
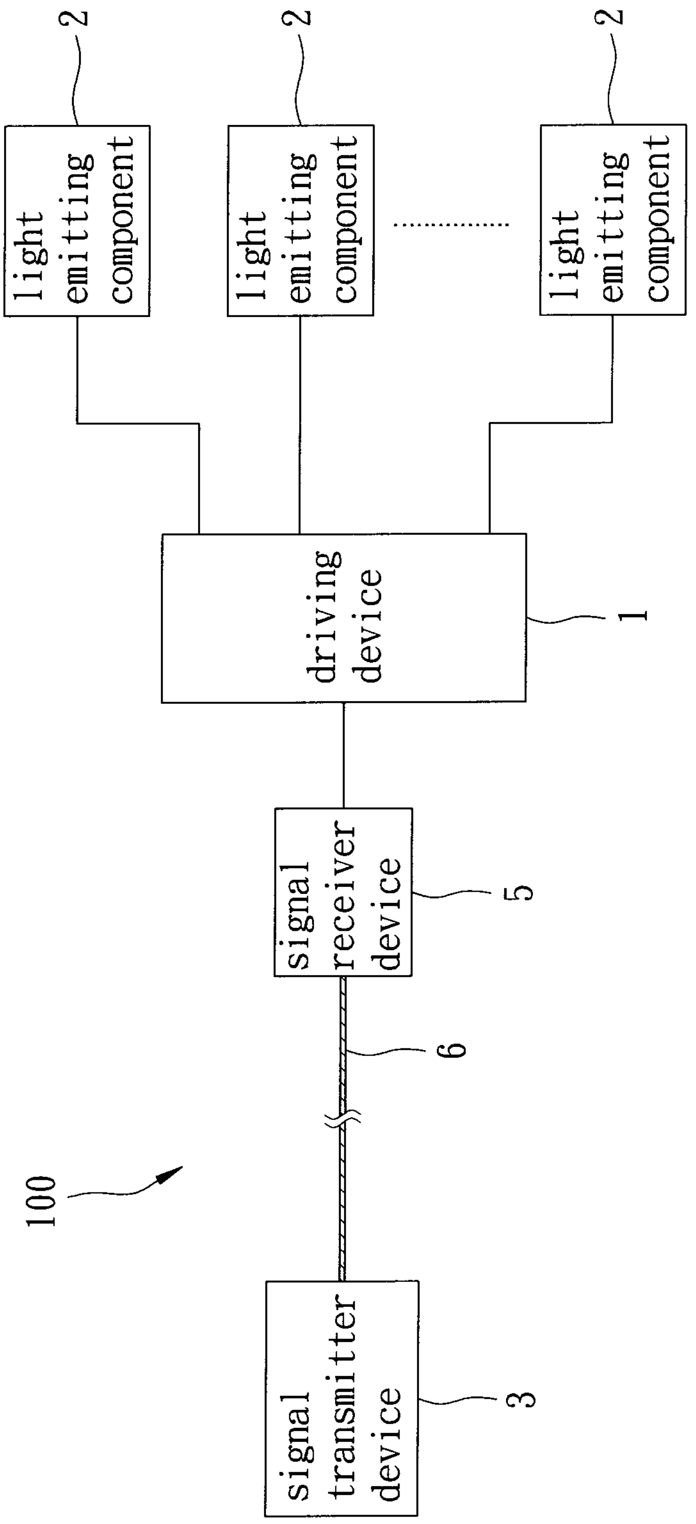
FIG. 1 is a block diagram to illustrate the preferred embodiment of an illumination system according to the present invention.

Referring to FIG. 1, the preferred embodiment of an illumination system 100 of the present invention includes a driving device 1, a plurality (N) of light emitting components 2 connected electrically to the driving device 1, a signal transmitter device 3, and a signal receiver device 5 operatively associated with the driving device 1 and connected electrically to the signal transmitter device 3 via a wired electrical connection 6.

The signal transmitter device 3 is configured to, in response to a control signal including control information that corresponds to the light emitting components 2, generate a coupling signal based on the control signal for transmission to the signal receiver device 5 via the wired electrical connection 6.

The signal receiver device 5 is configured to, in response to the coupling signal, control operation of the driving device 1 to individually and independently drive the light emitting components 2 according to the coupling signal received by the signal receiver device 5.

Figure 2:
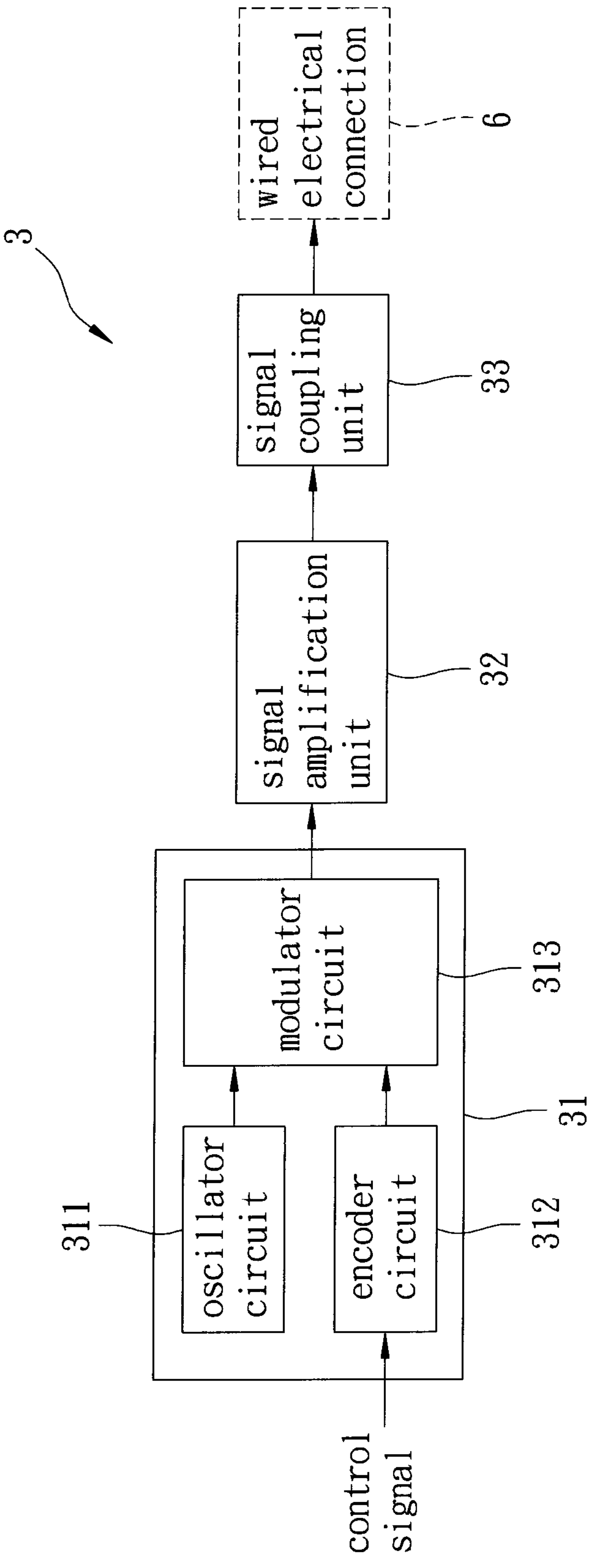
FIG. 2 is a block diagram to illustrate a signal transmitter device of the illumination system.

Referring to FIG. 2, the signal transmitter device 3 includes a signal modulator unit 31, a signal amplification unit 32, and a signal coupling unit 33.

The signal modulator unit 31 includes: an oscillator circuit 311, an encoder circuit 312, and a modulator circuit 313.

The oscillator circuit 311 is operable to generate an oscillation signal having a carrier frequency of such as 125 kHz.

The encoder circuit 312 is adapted to receive the control signal, and is operable to generate a plurality of transmitter-side signal frames, each of which has a start code portion, a plurality (N) of control code portions, and an end code portion, and each of which preferably has a time duration of 254×18 μs (4.572 ms), according to the control signal received by the encoder circuit 312. Each of the control code portions corresponds to a corresponding one of the light emitting components 2, and includes a predetermined number of bits (e.g., four bits). The transmitter-side signal frames have a frequency significantly lower than the carrier frequency of the oscillation signal such that the transmitter-side signal frames may be modulated onto the oscillation signal.

The modulator circuit 313 is connected electrically to the oscillator circuit 311 and the encoder circuit 312 for receiving the oscillation signal and the transmitter-side signal frames therefrom, and is operable to modulate the transmitter-side signal frames onto the oscillation signal according to on-off keying techniques so as to generate a modulated signal.

Figure 3:
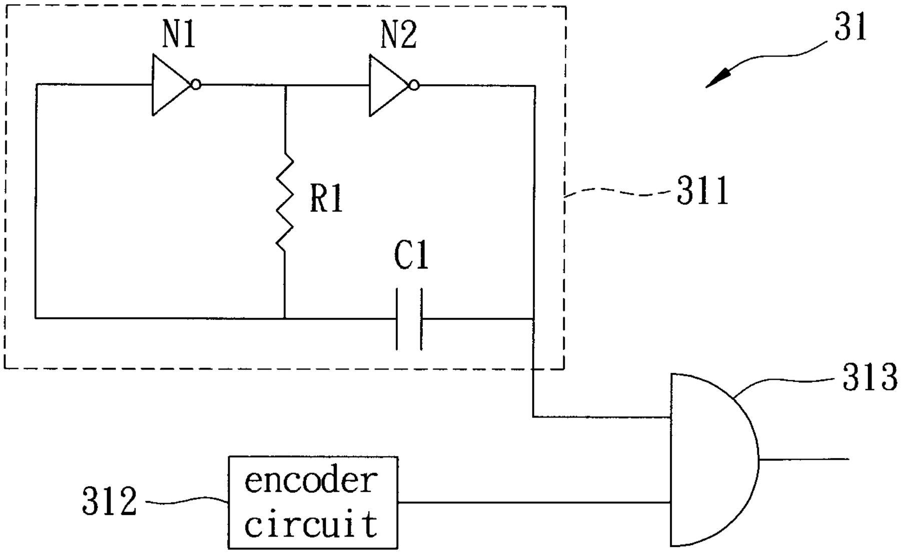
FIG. 3 is a circuit diagram to illustrate a signal modulator unit of the signal transmitter device.

Referring to FIG. 3, in this embodiment, the modulator circuit 313 is implemented as an AND gate that has first and second input terminals connected electrically and respectively to the oscillator circuit 311 and the encoder circuit 312 for receiving the oscillation signal and the transmitter-side signal frames therefrom, that is operable to perform a logic AND operation upon the transmitter-side signal frames and the oscillation signal so as to generate the modulated signal, and that further has an output terminal for outputting the modulated signal.

Further, in this embodiment, the oscillator circuit 311 is implemented as a complementary metal oxide semiconductor (CMOS) astable oscillator circuit including a first inverter N1, a second inverter N2, a capacitor C1, and a resistor R1. The first inverter N1 has an output terminal that is connected electrically to an input terminal of the second inverter N2, and that is connected electrically to an input terminal of the first inverter N1 via the resistor R1. The second inverter N2 has an output terminal that is connected electrically to the input terminal of the first inverter N1 via the capacitor C1, and that is connected to the input terminal of the second inverter N2 via the capacitor C1 and the resistor R1. In such a configuration, the oscillation signal is outputted to the modulator circuit 313 via the output terminal of the second inverter N2. The first and second inverters N1, N2 are realized using CMOS circuits.

Figure 4:
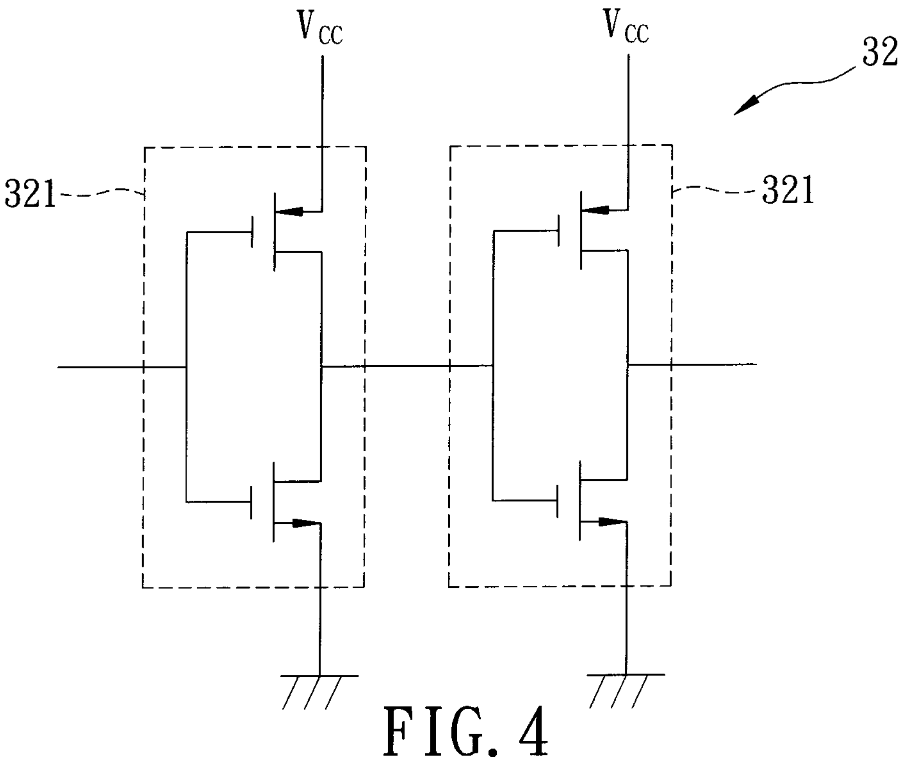
FIG. 4 is a circuit diagram to illustrate a signal amplification unit of the signal transmitter device.

Referring to FIGS. 2 and 4, the signal amplification unit 32 includes a cascaded pair of CMOS amplifiers 321 connected electrically to the modulator circuit 313 for receiving the modulated signal from the modulator circuit 313, and operable to perform two-stage signal amplification upon the modulated signal received by the CMOS amplifiers 321 so as to generate an amplified modulated signal, which is suitable for long distance transmission compared to the modulated signal. The signal amplification unit 32 may be implemented using TC4226 1.5 A Dual High-Speed Power MOSFET Drivers available from TelCom Semiconductor.

The signal coupling unit 33 (see FIG. 2) is connected electrically to the signal amplification unit 32 for receiving the amplified modulated signal from the signal amplification unit 32, and is operable to generate the coupling signal for transmission to the signal receiver device 5 via the electrical connection 6 according to the amplified modulated signal received by the signal coupling unit 33. The coupling signal thus generated includes control information corresponding to the control code portions of the transmitter-side signal frames, which correspond to the control information of the control signal received by the signal transmitter device 3.

Figure 5:
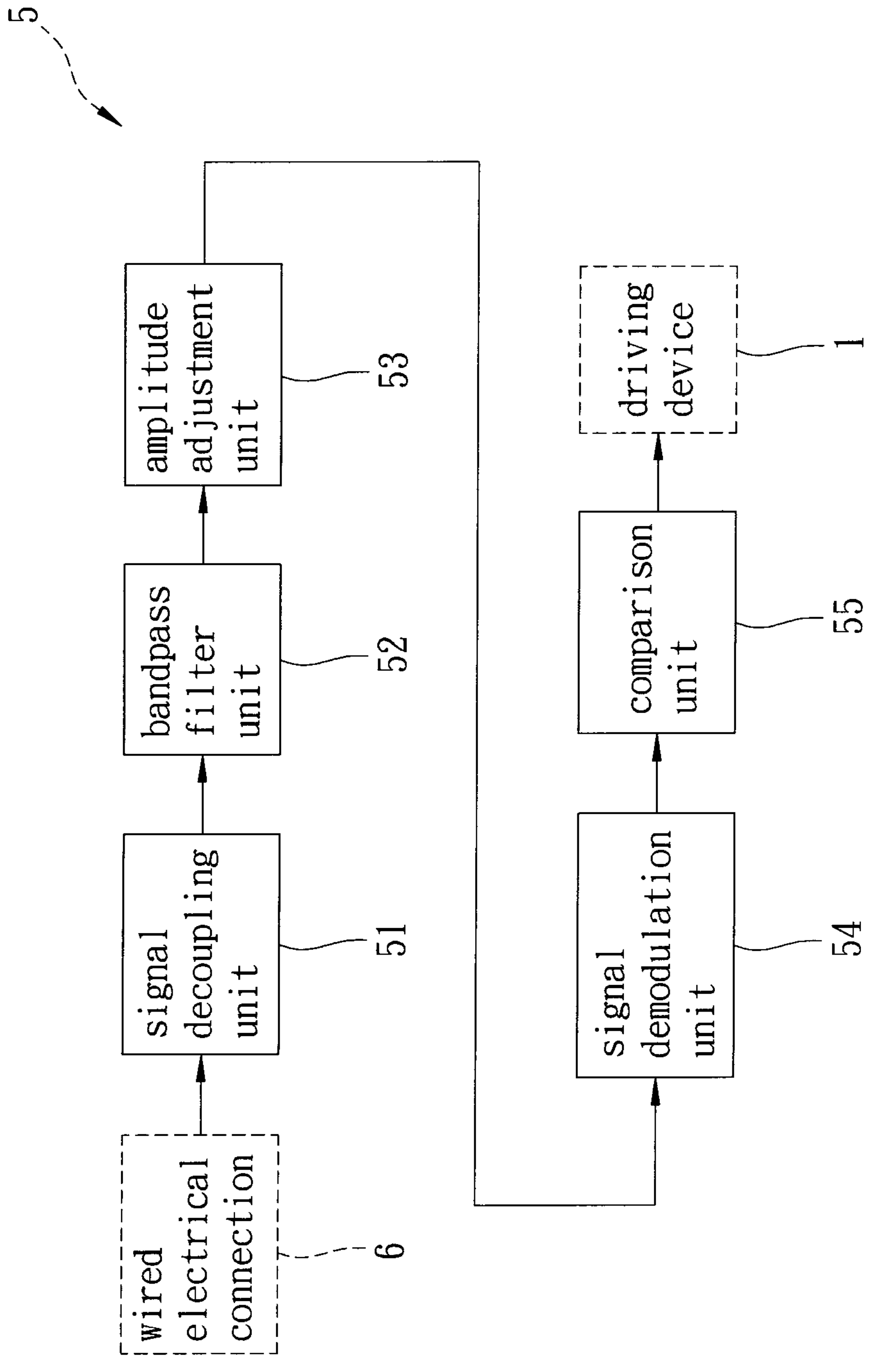
FIG. 5 is a block diagram to illustrate a signal receiver device of the illumination system.

Referring to FIG. 5, the signal receiver device 5 includes a signal decoupling unit 51, a bandpass filter unit 52, an amplitude adjustment unit 53, a signal demodulation unit 54, and a comparison unit 55.

The signal decoupling unit 51 is connected electrically to the electrical connection 6, and is operable to decouple the coupling signal from the electrical connection 6 so as to generate a decoupled signal.

Figure 6:
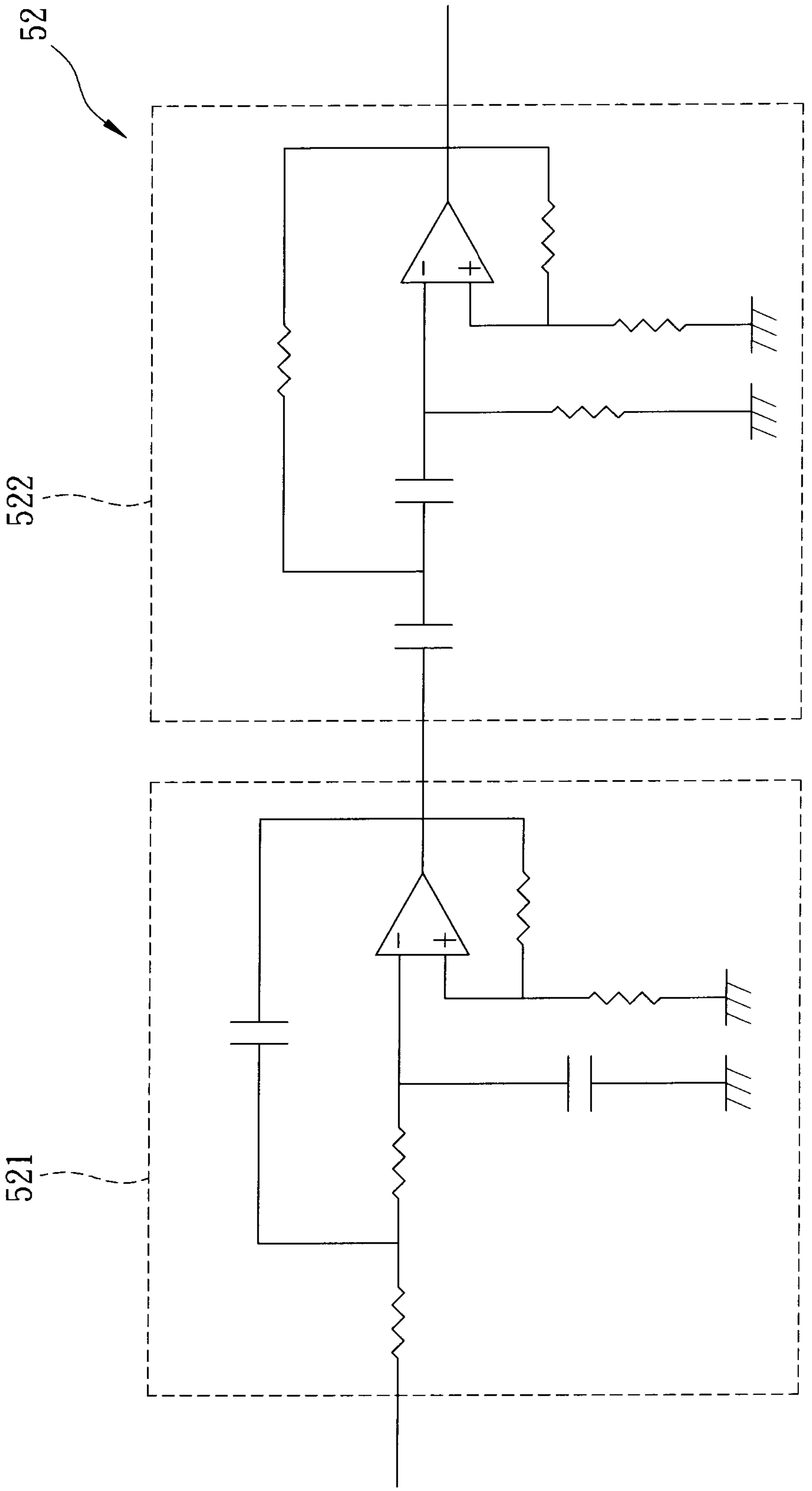
FIG. 6 is a circuit diagram to illustrate a bandpass filter unit of the signal receiver device.

The bandpass filter unit 52 is connected electrically to the signal decoupling unit 51 for receiving the decoupled signal from the signal decoupling unit 51, and is operable to filter frequency components, that do not fall within a predetermined frequency band corresponding to 125 kHz, from the decoupled signal so as to generate a filtered signal. Referring to FIG. 6, in this embodiment, the bandpass filter unit 52 includes a lowpass filter 521 and a highpass filter 522 that cooperate to filter frequency components, that do not fall within the predetermined frequency band corresponding to 125 kHz, from the decoupled signal so as to generate the filtered signal.

The amplitude adjustment unit 53 is connected electrically to the bandpass filter unit 52 for receiving the filtered signal from the bandpass filter unit 52, and is operable to adjust amplitude of the filtered signal so as to generate an adjusted signal having an amplitude that corresponds to a predetermined amplitude value. The amplitude adjustment unit 53 may be implemented using a variable gain amplifier AD603 available from ANALOG DEVICES.

The signal demodulation unit 54 is connected electrically to the amplitude adjustment unit 53 for receiving the adjusted signal from the amplitude adjustment unit 53, and is operable to demodulate the adjusted signal according to the on-off keying techniques so as to generate a demodulated signal. Specifically, during the demodulation process, the signal demodulation unit 54 is configured to extract envelope from the adjusted signal and to remove higher frequency components (i.e., 125 kHz) from the extracted envelope so as to generate the demodulated signal.

The comparison unit 55 is connected electrically to the signal demodulation unit 54 to receive the demodulated signal from the signal demodulation unit 54, and is operable to generate a plurality of receiver-side signal frames based on a result of comparison between the demodulated signal and a reference voltage. It is to be noted that the receiver-side signal frames are in digital form, and are related correspondingly to the transmitter-side signal frames generated by the signal transmitter device 3. That is, under normal circumstances, each of the receiver-side signal frames has a start code portion, a plurality (N) of control code portions, and an end code portion corresponding to those of a corresponding one of the transmitter-side signal frames. The control code portions of each of the receiver-side signal frames correspond to the control code portions of a corresponding one of the transmitter-side signal frames, respectively.

Figure 7:
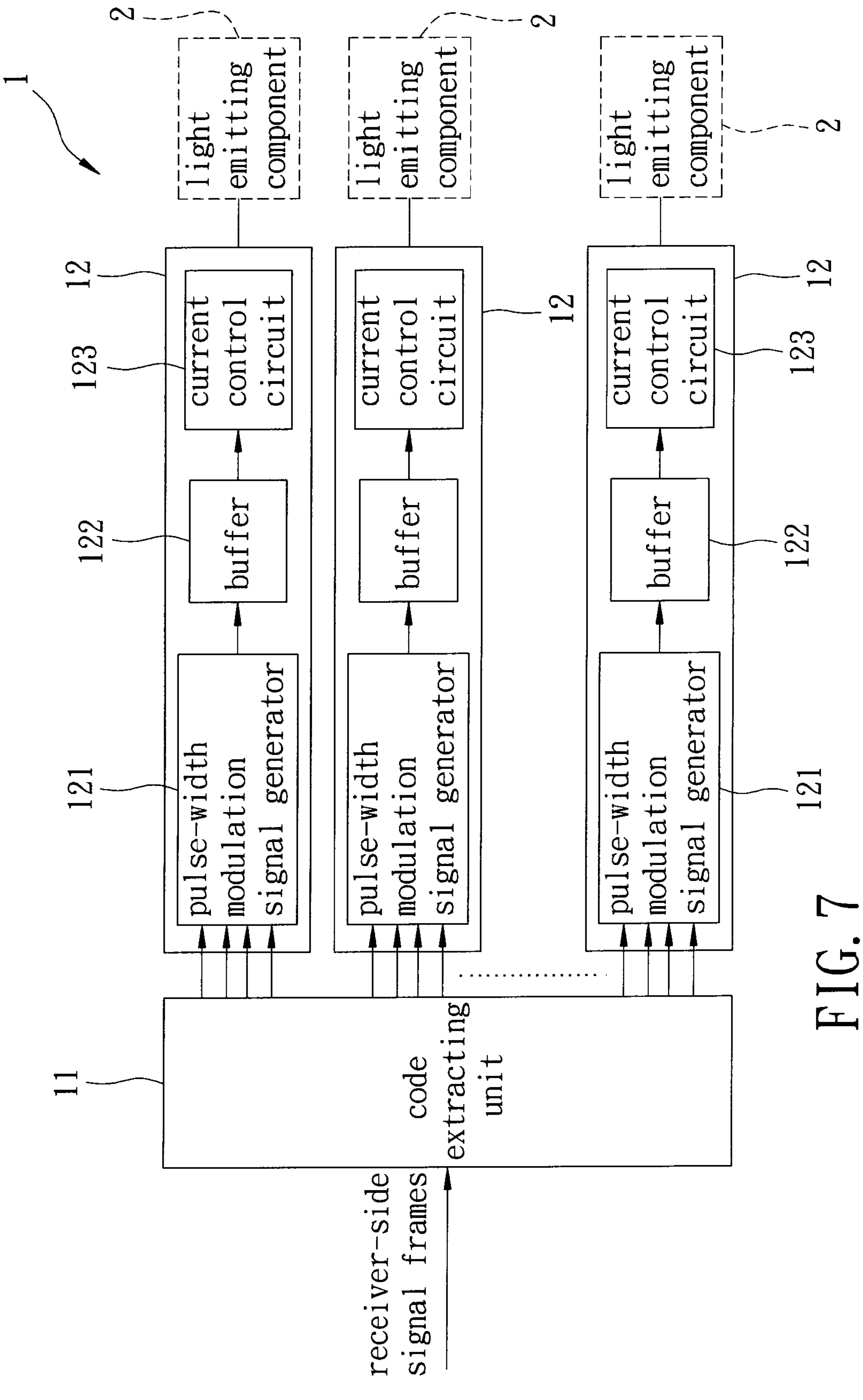
FIG. 7 is a block diagram to illustrate a driving device of the illumination system.

Referring to FIG. 7, the driving device 1 includes a code extracting unit 11, and a plurality (N) of current providing units 12. Each of the current providing units 12 includes a pulse-width modulation (PWM) signal generator 121, a buffer 122, and a current control circuit 123.

The code extracting unit 11 is connected electrically to the comparison unit 55 (see FIG. 5) for receiving the receiver-side signal frames from the comparison unit 55, has stored therein information for detecting the start code portions and the end code portions of the receiver-side signal frames, and is operable to extract the control code portions from the receiver-side signal frames received by the code extracting unit 11.

For each of the receiver-side signal frames, the PWM signal generator 121 of each of the current providing units 12 is connected electrically to the code extracting unit 11 for receiving a corresponding one of the control code portions of the receiver-side signal frame from the code extracting unit 11, and is operable to generate a PWM signal having a duty cycle dependent on the control code portion received by the PWM signal generator 121.

Shown in Table 1 are exemplary relationships between different logical states of the bits of the control code portions, and the duty cycles of the PWM signals.

TABLE 1

| Bits | Duty ratio (%) |
|---|---|
| 0000 | 0 |
| 0001 | 6.7 |
| 0010 | 13 |
| 0011 | 20 |
| 0100 | 27 |
| 0101 | 33.3 |
| 0110 | 40 |
| 0111 | 46.7 |
| 1000 | 53.3 |
| 1001 | 60 |
| 1010 | 66.7 |
| 1011 | 73.3 |

TABLE 1-continued

| Bits | Duty ratio (%) |
|---|---|
| 1100 | 80 |
| 1101 | 86.7 |
| 1110 | 93.3 |
| 1111 | 100 |

In this embodiment, for each of the current providing units 12, the duty cycle of the PWM signal has a positive relation to a decimal value of the bits of the corresponding control code portion. Specifically, in this embodiment, for each of the current providing units 12, the duty cycle of the PWM signal is equal to a result of division of the decimal value of the bits of the corresponding control code portion by two to the power of the number of bits of the corresponding control code portion.

Figure 8:
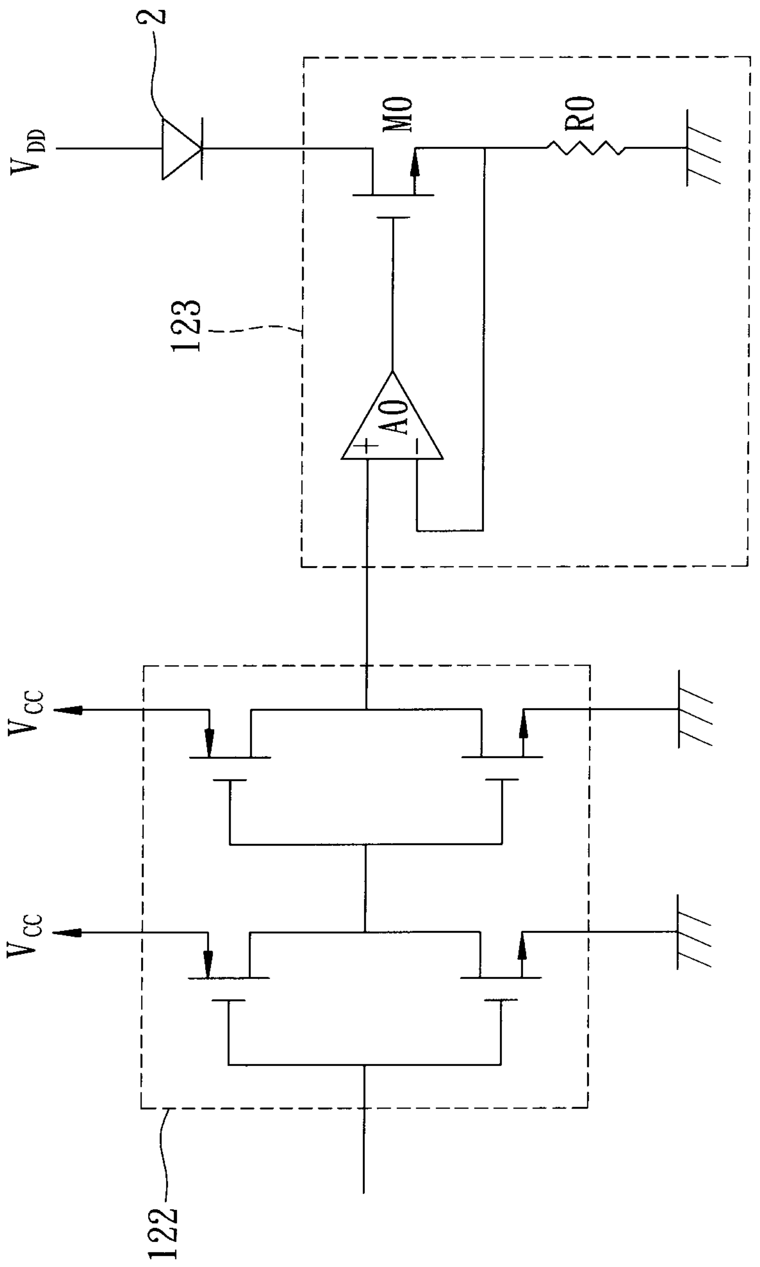
FIG. 8 is a circuit diagram to illustrate a buffer and a current control circuit of the driving device.

Referring to FIG. 8, for each of the current providing units 12, the buffer 122 includes a cascade pair of CMOS amplifiers connected electrically to the PWM signal generator 121 for receiving the PWM signal from the PWM signal generator 121, and operable to perform two-stage signal amplification upon the PWM signal received by the buffer 122 so as to generate an amplified PWM signal, which has a duty cycle corresponding to that of the PWM signal received by the buffer 122.

For each of the current providing units 12, the current control circuit 123 is connected electrically to the buffer 122 for receiving the amplified PWM signal from the buffer 122, is connected electrically to a corresponding one of the light emitting components 2, and is operable to control provision of a driving current through the corresponding one of the light emitting components 2 according the amplified PWM signal received by the current control circuit 123. The driving current has a magnitude in a positive relation to the control code portion received by the corresponding current providing unit 12, more particularly to the duty cycle of the amplified PWM signal received by the corresponding current control circuit 123.

In this embodiment, for each of the current providing units 12, the current control circuit 123 includes an operational amplifier (A0), a resistor (R0), and a transistor (M0). The operational amplifier (A0) has a non-inverting input terminal connected electrically to the buffer 122 for receiving the amplified PWM signal from the buffer 122, an inverting input terminal, and an output terminal. The transistor (M0) has a first terminal connected electrically to the corresponding light emitting component 2, a second terminal connected electrically to ground via the resistor (R0) and connected electrically to the inverting input terminal of the operational amplifier (A0), and a control terminal connected electrically to the output terminal of the operational amplifier (A0). In such a configuration, the operational amplifier (A0) controls switching of the transistor (M0) to control provision of the corresponding driving current through the corresponding light emitting component 2 according to the duty cycle of the amplified PWM signal received by the operational amplifier (A0).

It is to be noted that the PWM signal generated by the PWM signal generator 121 is a current-mode signal that, if provided directly to the current control circuit 123, may cause an output voltage of the buffer 122 to vary according to a load impedance of the corresponding light emitting component 2, which may have an adverse effect on stabilization of the driving current. Therefore, the buffer 122 is added between the PWM signal generator 121 and the current control circuit

123 for converting the PWM signal, which is a current-mode signal, into the amplified PWM signal, which is a voltage-mode signal having a predetermined, non-varying voltage. Thus, upon receipt of the amplified PWM signal, the operational amplifier (A0) is able to control switching of the transistor (M0) so as to control provision of the driving current such that the magnitude of the driving current is dependent solely on the resistor (R0). In such a configuration, light emitted by each of the light emitting components 2 has a brightness substantially corresponding to the duty cycle of the corresponding PWM signal.

Figure 9:
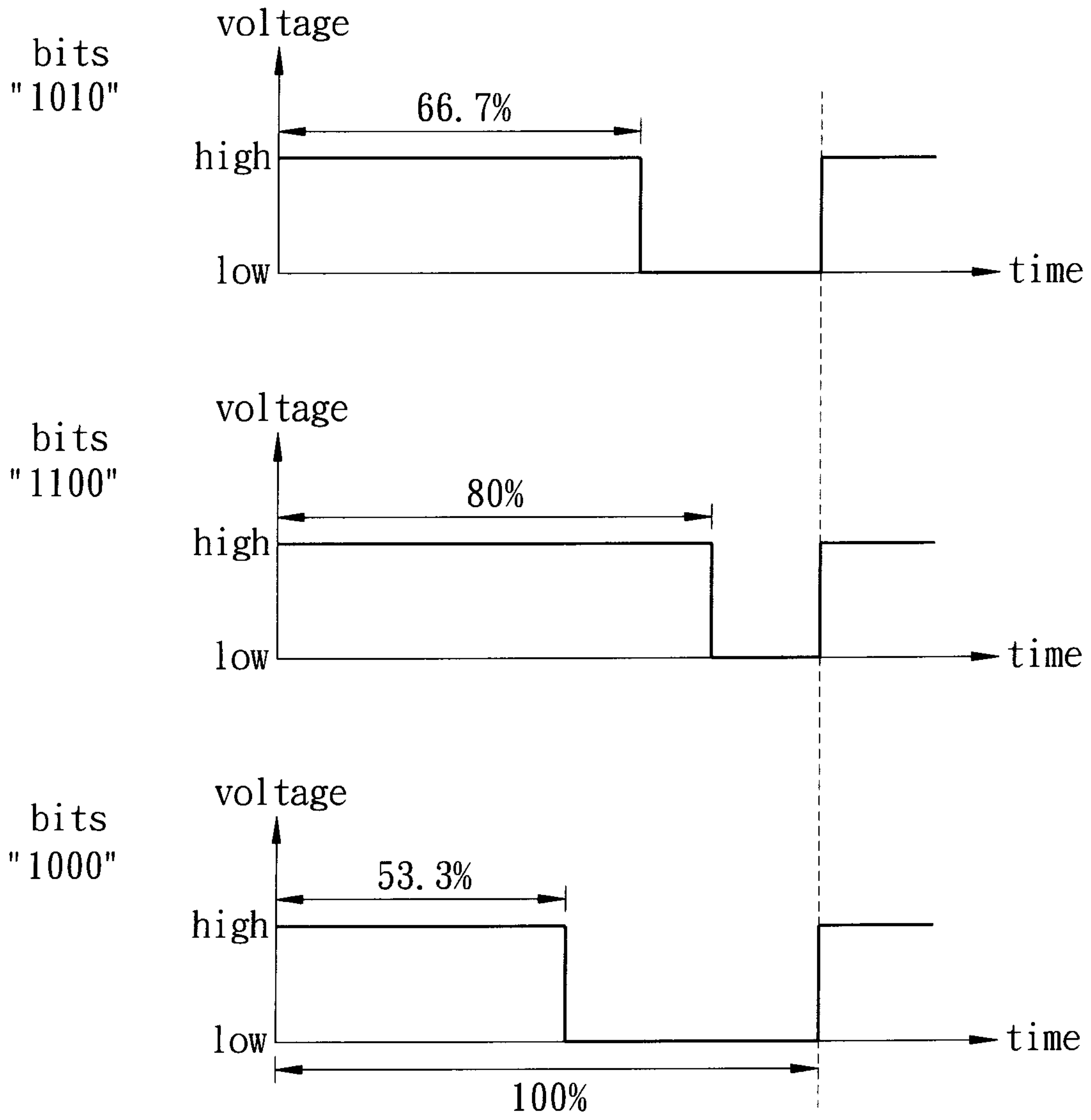
FIG. 9 shows timing diagrams obtained for the driving device in a scenario where the driving device is operatively associated with three light emitting components.

FIG. 9 shows timing diagrams obtained for a scenario where the driving device 1 is operatively associated with three of the light emitting components 2 (e.g., a red light emitting diode, a green light emitting diode, and a blue light emitting diode). Upon receipt of a receiver-side signal frame including control code portions of "1010", "1100", and "1001", the code extracting unit 11 is operable to extract the control code portions from the receiver-side signal frame for provision to the current providing units 12, which then respectively provide the driving currents through the light emitting component 2 according to the exemplary relationship shown in Table 1. Thus, in this scenario, for at least the duration of the receiver-side signal frame, the PWM signals according to which the light emitting components 2 are driven correspond to the duty cycles of 66.7%, 80%, and 53.3%, respectively. The relationships between the duty cycles and the bits may be otherwise in other embodiments. Moreover, the number of bits in each control code portion is not limited to what is disclosed herein.

It is worth noting that the light emitting components 2 may be implemented as individual light emitting diodes, or may be packaged into a single light emitting unit.

In a modification, the driving device 1 may be operatively associated with a single light emitting component 2.

In summary, through adjusting the duty cycles of the PWM signals, the light emitting components 2 may be individually controlled to emit light at respective illumination intensities.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An illumination system comprising:

a first light emitting component;

a signal receiver device configured to, in response to a coupling signal that includes control information corresponding to said first light emitting component, generate a receiver-side signal frame based on the control information of the coupling signal, the receiver-side signal frame including a first control code portion corresponding to said first light emitting component; and a driving device including a code extracting unit connected electrically to said signal receiver device for receiving the receiver-side signal frame from said signal receiver device, and operable to extract the first control code portion from the receiver-side signal frame received by said code extracting unit, and a first current providing unit connected electrically to said code extracting unit for receiving the first control code portion from said code extracting unit, and connected electrically to said first light emitting component for providing a first driving current through said first light emitting component according to the first control code portion received by said first current providing unit, the first driving current having a magnitude dependent on the first control code portion received by said first current providing unit;

wherein said first current providing unit includes a first pulse-width modulation (PWM) signal generator connected electrically to said code extracting unit for receiving the first control code portion from said code extracting unit, and operable to generate a first PWM signal having a duty cycle dependent on the first control code portion received by said first PWM signal generator, the magnitude of the first driving current being dependent on the duty cycle of the first PWM signal;

wherein said first current providing unit further includes: a first buffer connected electrically to said first PWM signal generator for receiving the first PWM signal from said first PWM signal generator, and operable to perform signal amplification upon the first PWM signal received by said first buffer so as to generate a first amplified PWM signal, which has a duty cycle corresponding to that of the first PWM signal; and a first current control circuit including: an operational amplifier having a first input terminal connected electrically to said first buffer for receiving the first amplified PWM signal from said first buffer, a second input terminal, and an output terminal; a resistor; and a transistor having a first terminal connected electrically to said first light emitting component, a second terminal connected electrically to ground via said resistor and connected electrically to said second input terminal of said operational amplifier, and a control terminal connected electrically to said output terminal of said operational amplifier, said operational amplifier controlling switching of said transistor to control provision of the first driving current through said first light emitting component according to the duty cycle of the first amplified PWM signal received by said operational amplifier, the magnitude of the first driving current being dependent on the duty cycle of the first amplified PWM signal.

2. The illumination system as claimed in claim 1, wherein said first buffer includes a cascaded pair of complementary metal-oxide-semiconductor amplifiers.

3. The illumination system as claimed in claim 1, wherein the first amplified PWM signal is a voltage-mode signal.

4. The illumination system as claimed in claim 1, wherein the first control code portion includes a plurality of bits, the duty cycle of the first PWM signal having a positive relation to a decimal value of the bits of the first control code portion.

5. The illumination system as claimed in claim 4, wherein the duty cycle of the first PWM signal corresponds to a result of division of the decimal value of the bits of the first control code portion by two to the power of the number of bits of the first control code portion.

6. The illumination system as claimed in claim 1, further comprising a second light emitting component, wherein: the control information of the coupling signal further corresponds to said second light emitting component, the receiver-side signal frame further including a second control code portion corresponding to said second light emitting component; said code extracting unit is further operable to extract the second control code portion from the receiver-side signal frame received by said code extracting unit; and said driving device further includes a second current providing unit connected electrically to said code extracting unit for receiving the second control code portion from said code extracting unit, and connected electrically to said second light emitting component for providing a second driving current through said second light emitting component according to the second control code portion received by said second current providing unit, the second driving current having a magnitude dependent on the second control code portion received by said second current providing unit.

7. The illumination system as claimed in claim 1, further comprising a signal transmitter device including: a signal modulator unit including an oscillator circuit operable to generate an oscillation signal, an encoder circuit adapted to receive a control signal, and operable to generate a transmitter-side signal frame according to the control signal received by said encoder circuit, the transmitter-side signal frame having the first control code portion corresponding to said first light emitting component, and a modulator circuit connected electrically to said oscillator circuit and said encoder circuit for receiving the oscillation signal and the transmitter-side signal frame therefrom, and operable to modulate the transmitter-side signal frame onto the oscillation signal so as to generate a modulated signal; a signal amplification unit connected electrically to said modulator circuit for receiving the modulated signal from said modulator circuit, and operable to perform signal amplification upon the modulated signal received by said signal amplification unit so as to generate an amplified modulated signal; and a signal coupling unit connected electrically to said signal amplification unit for receiving the amplified modulated signal from said signal amplification unit, and operable to generate the coupling signal for transmission to said signal receiver device according to the amplified modulated signal received by said signal coupling unit, the control information of the coupling signal corresponding to the first control code portion of the transmitter-side signal frame.

8. The illumination system as claimed in claim 7, wherein said signal amplification unit includes a cascaded pair of complementary metal-oxide-semiconductor amplifiers.

9. A driving device adapted to receive a receiver-side signal frame and adapted to be connected electrically to a light emitting component for driving the light emitting component according to the receiver-side signal frame, the receiver-side signal frame including a control code portion corresponding to the light emitting component, said driving device comprising:

- a code extracting unit adapted to receive the receiver-side signal frame, and operable to extract the control code portion from the receiver-side signal frame received by said code extracting unit; and a current providing unit connected electrically to said code extracting unit for receiving the control code portion from said code extracting unit, and adapted to be connected electrically to the light emitting component for providing a driving current through the light emitting component according to the control code portion received by said current providing unit the driving current having a magnitude dependent on the control code portion received by said current providing unit;
- wherein said current providing unit includes a pulse-width modulation (PWM) signal generator connected electrically to said code extracting unit for receiving the control code portion from said code extracting unit and operable to generate a PWM signal having a duty cycle dependent on the control code portion received by said PWM signal generator, the magnitude of the driving current being dependent on the duty cycle of the PWM signal;
- wherein said current providing unit further includes:
  - a buffer connected electrically to said PWM signal generator for receiving the PWM signal from said PWM signal generator, and operable to perform signal amplification upon the PWM signal received by said buffer so as to generate an amplified PWM signal, which has a duty cycle corresponding to that of the PWM signal; and
  - a current control circuit including
    - an operational amplifier having a first input terminal connected electrically to said buffer for receiving the amplified PWM signal from said buffer, a second input terminal, and an output terminal;
    - a resistor; and
    - a transistor having a first terminal adapted to be connected electrically to the light emitting component, a second terminal connected electrically to ground via said resistor and connected electrically to said second input terminal of said operational amplifier, and a control terminal connected electrically to said output terminal of said operational amplifier, said operational amplifier controlling switching of said transistor to control provision of the driving current through the light emitting component according to the duty cycle of the amplified PWM signal received by said operational amplifier, the magnitude of the driving current being dependent on the duty cycle of the amplified PWM signal.

10. A signal transmitter device comprising: a signal modulator unit including an oscillator circuit operable to generate an oscillation signal, an encoder circuit adapted to receive a control signal, and operable to generate a transmitter-side signal frame according to the control signal received by said encoder circuit, the transmitter-side signal frame having a control code portion corresponding to a light emitting component, and a modulator circuit connected electrically to said oscillator circuit and said encoder circuit for receiving the oscillation signal and the transmitter-side signal frame therefrom, and operable to modulate the transmitter-side signal frame onto the oscillation signal so as to generate a modulated signal; a signal amplification unit connected electrically to said modulator circuit for receiving the modulated signal from said modulator circuit, and operable to perform signal amplification upon the modulated signal received by said signal amplification unit so as to generate an amplified modulated signal; and a signal coupling unit connected electrically to said signal amplification unit for receiving the amplified modulated signal from said signal amplification unit, and operable to generate a coupling signal for transmission according to the amplified modulated signal received by said signal coupling unit, the coupling signal including control information that corresponds to the control code portion of the transmitter-side signal frame and that is for controlling operation of the light emitting component.

* * * * *